United States Patent [19]

Stevens

[11] 4,159,122
[45] Jun. 26, 1979

[54] FOLDING STEP FOR VEHICLE

[76] Inventor: Kenneth E. Stevens, Rte. 1, Long Prairie, Minn. 56347

[21] Appl. No.: 892,841

[22] Filed: Apr. 3, 1978

[51] Int. Cl.² ............................................. B60R 3/00
[52] U.S. Cl. ................................... 280/166; 182/91; 108/134
[58] Field of Search .................. 280/166, 164; 182/91; 108/134

[56] References Cited

U.S. PATENT DOCUMENTS

| 2,700,835 | 1/1955 | Dyrud | 108/134 |
| 3,492,020 | 1/1970 | Misgrave | 280/166 |
| 4,029,355 | 6/1977 | Wilhelmsen | 280/166 |
| 4,057,125 | 11/1977 | Kroft | 182/91 |

*Primary Examiner*—Robert R. Song
*Attorney, Agent, or Firm*—Kinney, Lange, Westman and Fairbairn

[57] ABSTRACT

A folding step for vehicles, and specifically for use on the front bumpers of large semitrailer tractors. The step is used for servicing the vehicles, for example, cleaning the windshield and the like and yet will permit the step to be folded up very quickly for transport position. It also may be used as an entrance step for vehicles. The step automatically locks under spring pressure in either its usable or stored positions, and thus minimum time is utilized in operating the step, and safety is enhanced.

8 Claims, 4 Drawing Figures

4,159,122

FOLDING STEP FOR VEHICLE

BACKGROUND OF THE INVENTION

1. Field of the Invention

The present invention relates to steps which can be stored for transport which can be used as support platforms for servicing vehicles or for entry of vehicles.

2. Prior Art

Folding steps have been advanced in the prior art, including folding steps which are used for entering and departing from high vehicles such as trucks. Also parallel linkage folding steps have been utilized for camping trailers and the like.

In most of the prior art devices complex linkage is necessary, raising the cost, and making operation difficult.

SUMMARY OF THE INVENTION

A folding step which can be easily attached to a vehicle, and in particular is adaptable for use for attachment to the front bumper of a semitrailer tractor or truck, which includes means for folding it in either a stored position generally flat against the grill of the tractor or against the surface with which it is to be used or in its normal working position which is generally horizontal. The step is spring loaded, and in combination with the frame members is locked in its raised position or its usable position under spring pressure.

The step is sturdy, and includes telescoping supports to provide rigidity. The step is easily made, and low in cost, and provides rapid conversion from its stored to its usable position. The unit stores very closely to the grill of a truck when mounted on the front bumper and is very convenient for quickly being lowered to permit washing of the windshield of a tractor or truck on a sturdy platfor. The high semitrailer tractors that are presently in use are impossible to reach standing on the ground.

DESCRIPTION OF THE PREFERRED EMBODIMENT

Figure 1:
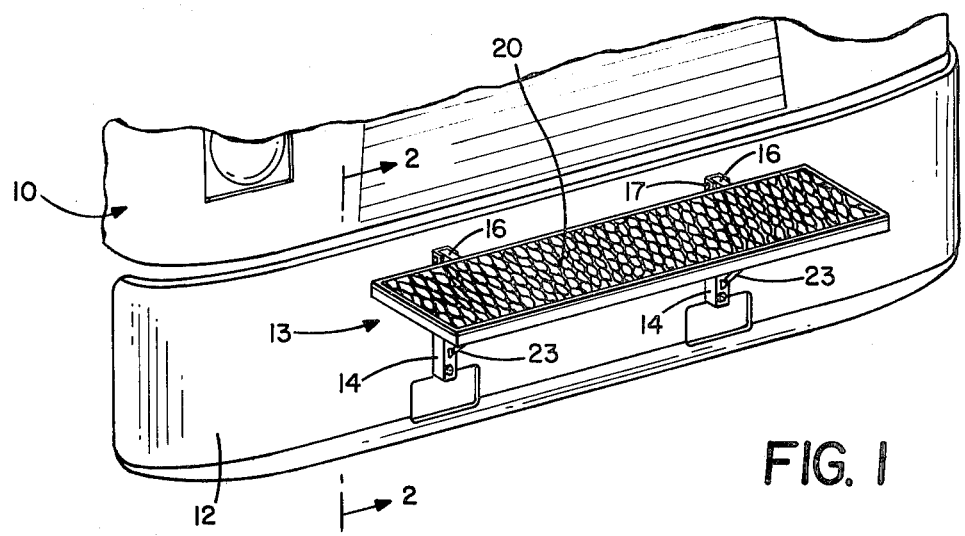
FIG. 1 is a fragmentary perspective view of a cab on a semitrailer tractor showing the step made according to the present invention installed on the front bumper.

In FIG. 1, a semitrailer tractor indicated generally at 10 is of the cab over engine type, and as is normal as the windshield of the unit is extremely high. The windshield cannot be reached from the ground, and standing on the bumper indicated at 12 is an impossible task which provides no real support and in general is dangerous.

Figure 2:
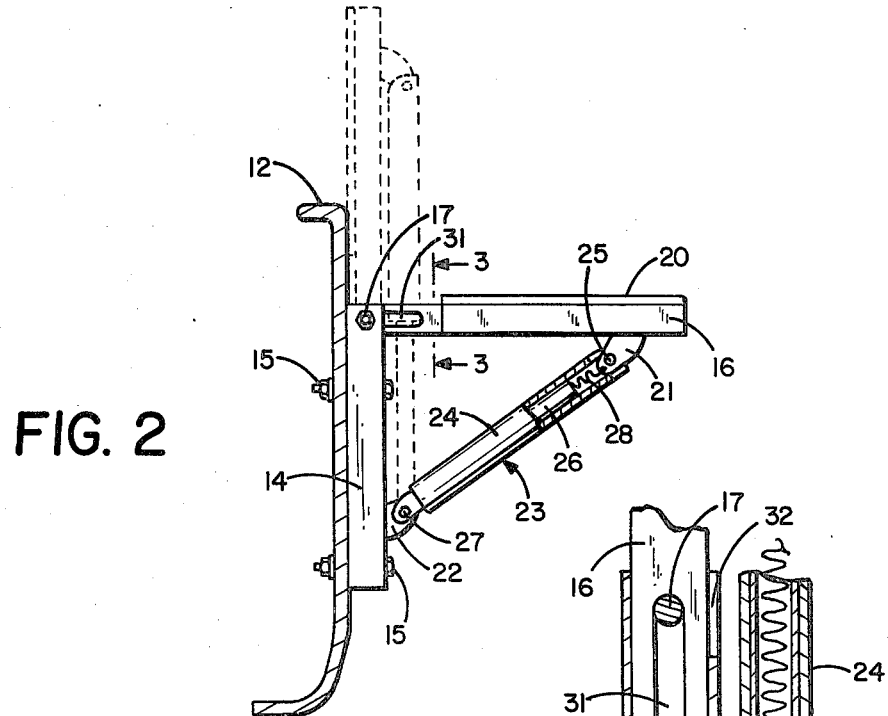
FIG. 2 is a side elevational view of the step in working position and a dotted line showing the step in its stored position with parts in section and parts broken away.
Figure 3:
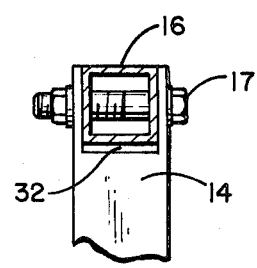
FIG. 3 is a fragmentary sectional view taken as on line 3—3 in FIG. 2.

The step of the present invention is shown generally at 13, and it is attached to the bumper 12 in a suitable manner. The step comprises a pair of upright support members 14, 14 which are bolted to the bumper 12 in the usual manner with suitable bolts indicated at 15 (FIG. 2). The upright supports 14 are spaced apart as shown, and each of them pivotally mounts a generally horizontal support tube indicated generally at 16 with a pivot bolt 17. The upright supports 14 are square tubular members, and the horizontal supports 16 are also square tubes, but of a smaller size so that they fit within the interior opening of the upright tubes 14. This can perhaps best be seen in FIGS. 3 and 4. The supports 16 in turn support a cross tread member or step member indicated generally at 20 which is positioned spaced outwardly from the pivotal mounting 17 of the horizontal members.

Each of the supports 16 has a downwardly depending ear 21 on the lower surface thereof, and each of the vertical members 14 has an ear 22 mounted thereon. These ears in turn each pivotally mount one end of a pair of struts comprising telescoping tube assemblies indicated generally at 23. Each telescoping tube assembly includes an outer tube section 24 which is pivotally mounted as at 25 to the respective ear 21. Note that the tube is cut away for clearance for the ear so that the side portions of the tube support the pivot mounting. An inner tube section 26, which telescopes inside the tube section 24, is pivotally mounted as at 27 to the lower ear 22.

In the working position with the tread or step member horizontal as shown in FIG. 2, the end of outer tube section 24 abuts against and rests on pins 27 or portions of ears 22 which are supported on the respective upright members 14 so that a positive compression carrying support is formed by tube sections 24 through the pivot pins 25.

Further, there is an internal tension spring 28 mounted inside each of the smaller tube sections 26. The ends of the springs 28 are hooked to the aligning ears 21 and 22, respectively. The springs 28 are of a size so that a resilient tension force is exerted tending to pull the cross member 16 to a horizontal position (clockwise as shown) about the pivot pins 17.

Figure 4:
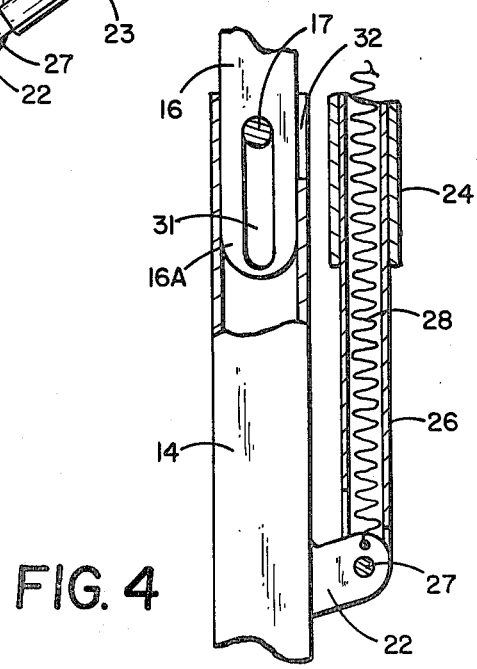
FIG. 4 is a sectional view taken as on line 4—4 in FIG. 3 with parts in section and parts broken away.

It should be noted that the horizontal members 16 each include elongated slots 31 as shown in FIG. 4. These slots slidably receive the pivot pins 17. The members 16 are each positioned in a notch 32 that are formed in the supports 14 when the tube 16 is pivoted to a horizontal position. Any load on the step 20 and the horizontal tube 16 is carried through the compression carrying braces or struts comprising the telescoping tubes 23.

For storage in a vertical stored position of the step, which is shown in dotted lines in FIG. 2, the step is lifted up against the action of the springs 28 about pivots 17. When the step is pivoted so that the generally horizontal members 16 are perpendicular or vertical, the end portions of the members 16 will slide into the interior of the upright tubes 14 as shown in FIG. 4. The slots 31 permit the ends of members 16 to slip into the interior of upright members 14. The end portions 16A of member 16 slide below the level of the notch portions 32. The pins 17 will be at opposite ends of the slots 31 from there positions when the members 16 are horizontal (as shown in FIG. 4) and the springs 28 will continue to act between the respective ears 21 and 22 to pull the members 16 downwardly into the interior of the upright members 14 and latch the step in its vertical position.

When the step is again to be used, the step is grasped and pulled vertically against the force of springs 28 so that the tubes 16 slide up along slots 31 relative to the pins forming pivots 17 until such time as the end portion 16A can be pivoted to horizontal position, which is the working position.

The force of the springs holds the step in storage position in a secure manner without having manual latches. The unit is compact, and easily manufactured and readily used so that even during a short stop for cleaning the windshield the step can be erected without having any problem. Further, the step is safely stored, and will not rattle or come loose during driving. Thus the step is not hazardous. It should be noted that the support or tread portion of the step is made of an expanded metal support so that air can flow through the grill portion of the tractor without any problem.

What is claimed is:

1. A folding step for use in connection with a vehicle comprising a tubular upright support member, means to attach said upright support member to a vehicle in a desired position, a second support member telescopingly fitting into said upright support member, a tread member operatively mounted on said second support member, means to pivotally mount said upright support member and said second support member together adjacent the upper end of said upright support member, a strut pivotally connected at one end to said upright support member and at the other end to said second support member at location spaced from the upright support member, said strut comprising an extendable support member which has a minimum length and being adapted to carry compression when the second support member is generally horizontal, said means to pivotally mount said second support member to said upright support member permitting said second support member to be moved to a position generally parallel to said upright support member and then to move to a latched position, and bias means to urge said second support member to its latched position when it is generally parallel to said upright support.

2. The folding step of claim 1 wherein said upright support member is tubular, and said second support member telescopes into said upright support to move to said latched position.

3. The folding step of claim 1 wherein said means to pivotally mount said upright support member and second support member comprises a slot in one of said members and a pin mounted in the other member and being slidable in said slot to permit said second support to telescope relative to the upright member a distance equal to the effective length of said slot.

4. The folding step of claim 1 wherein said strut comprises a pair of telescoping strut members, a first strut member being pivotally mounted to the second support member and a second of said strut members being pivotally mounted to said upright support member.

5. The combination as specified in claim 2 wherein said strut comprises tubular members, and said bias means comprises a tension spring mounted inside said telescoping strut members and said diagonal brace comprises a pair of telescoping tubes.

6. The combination as specified in claim 1 wherein said strut comprises a pair of telescoping tubes of generally circular cross section, and a first of said telescoping tubes being pivotally mounted to said second support member, and a second of said telescoping tubes being pivotally mounted to said upright support members and positioned inside said first telescoping tube, said first telescoping tube abutting against portions of said upright support member when the second support member is in its desired position.

7. The combination as specified in claim 1 wherein there are a pair of upright supports positioned transversely relative to said vehicle, said pair of upright supports being attachable to the front bumper of a vehicle.

8. The combination as specified in claim 1 wherein said second support member telescopes into the upright support members when in a position generally to said upright support and is thereby retained in latched position.

* * * * *